March 31, 1970  E. J. J. M. VAN THIEL  3,503,298
WALL PLUGS AND THE LIKE

Filed July 8, 1968  2 Sheets-Sheet 1

INVENTOR
Etienne J.J.M Van Thiel

BY Schmidt, Johnson, Hovey,
Williams & Bradley
ATTORNEYS.

March 31, 1970  E. J. J. M. VAN THIEL  3,503,298
WALL PLUGS AND THE LIKE

Filed July 8, 1968  2 Sheets-Sheet 2

PRIOR ART

INVENTOR
Etienne J.J.M. Van Thiel
BY Schmidt, Johnson, Hovey,
Williams & Bradley
ATTORNEYS.

United States Patent Office 3,503,298
Patented Mar. 31, 1970

3,503,298
WALL PLUGS AND THE LIKE
Etienne J. J. M. van Thiel, Oranjelaan 40,
Beek en Donk, Netherlands
Filed July 8, 1968, Ser. No. 750,416
Claims priority, application Netherlands, July 27, 1967,
6710357
Int. Cl. F16b 13/06
U.S. Cl. 85—75                                9 Claims

ABSTRACT OF THE DISCLOSURE

A wall plug comprising two or more outer partially cylindrical elements interconnected at one end to permit shifting of the opposite ends of the elements outwardly from the axis of the plug to expand the latter. Tapered thickenings integral with the elements on the inner surfaces thereof cooperate with a bolt having a faceted nut to force the elements into their expanded positions upon rotation of the nut relative to said thickenings.

---

This invention concerns wall plugs. Wall plugs are known which comprise two or more outer parts retained together at a head end by a resilient ring or cap, and, if necessary, by a further ring at the other or bottom end, a member in the form of a nut or the head of a bolt being located between the outer parts, adjacent the bottom end.

Such known wall plugs have certain disadvantages; for instance, the member e.g. the nut has to be moved axially by a relatively large distance in order to expand the plug by causing the outer parts to diverge. Also, as the inner surfaces of the bottom end portions of the outer parts are severely cut away commensurate with the nut, upon expansion of the plug these bottom end portions, being relatively thin, may be deflected inwardly by the pressure reaction with the surrounding material e.g. of a wall, thereby limiting or decreasing the effectiveness of the wall plug.

An object of the invention is to provide an improved form of wall plug, and accordingly the present invention provides a wall plug or the like comprising two or more outer-parts having a head end and, between the other or bottom end portions of the outer parts, a tapering member in the form of the head of a bolt or a nut, which member is provided with facets, the bottom end portions of the outer parts being provided with inwardly directed thickenings tapered so as to cause the member to be rotated as it is drawn axially towards the head end of the plug.

The provision of thickenings on the bottom end portions of the outer parts enable both of the aforementioned disadvantages to be overcome, as the thickenings reinforce said bottom end portions and provide surfaces or edges which cause the shaped nut or head to rotate as hereinafter described.

Therefore, for a given length of axial movement of the tapering member, the plug of the invention will be expanded more effectively, and consequently for a given expansion the overall length of the screw and the outer parts of the plug of the invention may be relatively shorter enabling a saving in materials to be made which is important where mass-produced articles are concerned.

The invention will now be described in detail, by way of example, with reference to a preferred embodiment shown in the accompanying drawings, wherein.

As shown in FIGURES 1 to 6 of the drawings, the wall plug of the invention comprises four elongated, partially cylindrical outer parts 1, and a bolt 2 having a head which is shown as a hexagon but may be a socketed head for a key, or a hook or like functional head. The outer parts 1 are kept together at the head end of the plug by means of a resilient cap 3 and adjacent the other or bottom end by means of a resilient ring 4.

Figure 1:
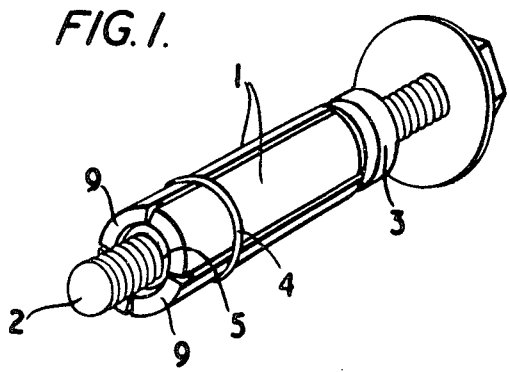
FIG. 1 shows the wall plug of the invention, in perspective.
Figure 4:
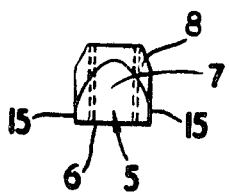
FIG. 4 shows a tapering member in the form of a nut of the wall plug, in elevation.
Figure 5:
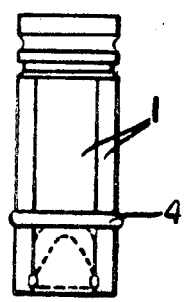
FIG. 5 is a diagrammatical view, in elevation, of the wall plug.

Within the bottom end as shown in FIGURES 1 and 5 is a tapering member in the form of a nut 5 which, as shown in FIG. 4 is provided with a flat trailing end face 6. The trailing end portion of the nut 5 is of rectangular form having four facets 7. The other or leading end portion of the nut 5 is coned to provide a circular or annular leading end face, the form of the coned peripheral surface 8 being such that the facets 7 extend into the leading end portion but join to produce corner edges 15 only at the trailing end portion of the nut 5, so that these edges are relatively short, as shown, or alternatively the edges may be so short as to exist only as points at the trailing end.

The outer parts 1 are each provided, at the bottom end, with a respective flange 9, which together serve to retain the nut 5 in the plug even when the bolt 2 is removed.

Figure 10:
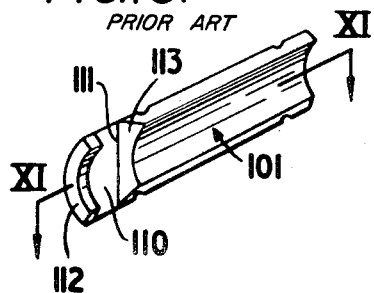
FIG. 10 shows an outer part of the prior known wall plug, in perspective similar to FIG. 2.
Figure 11:
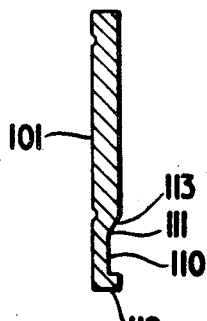
FIG. 11 shows a section of the outer part corresponding to the line XI—XI of FIG. 10.

In the known wall plug shown in FIGURES 10 and 11 the bottom end portion of each outer part 101 is provided with a flat 110 of rectangular form which extends, parallel to the axis of the plug, from one longitudinal edge of the part to the other, and produces a line 111, parallel to the end face 112, where a short ramp 113 extends across the part 101.

However, in the wall plug of the invention each part 1 is provided with a flat 10 of triangular form which extends parallel to the axis so that the apex 11 of the triangular form lies on the center line of the outer part 1. Bounding the two sides subtending the apex 11 of the triangle are a pair of thickenings 13 which increase in width and thickness from adjacent the flange 9 on either side of the flat 10 to a line 16 whereat ramp faces 17 provided by the thickenings 13 merge with an inner curved face 18 of the outer part. The apex 11 is on a line perpendicular to the line 16 and the axis of the plug.

The thickenings 13 thereby provide a pair of edges 14 whose slope is inclined from the bottom end to the point at which the line 16 is met by the line from the apex 11.

Figure 2:
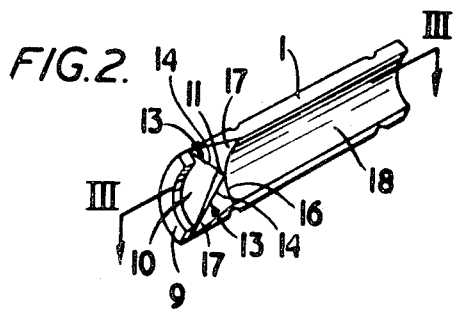
FIG. 2 shows an outer part of the wall plug, in perspective.

On comparing the outer part 1 of FIGURE 2 with the prior known outer part 11 of FIG. 10 it will be seen that by virtue of the thickenings 13 there is far more material present in the portion of the part 1 adjacent the line 16 than there is at the corresponding portion adjacent the line 111 of the known part 101, the thickenings thereby serving to reinforce the part 1 of the plug of the invention.

Figure 6:
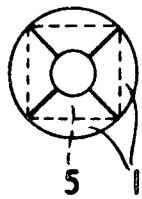
FIG. 6 is a bottom view of the wall plug shown in FIG. 5.

In use, with the correct shape of nut 5, as hereinbefore described wherein the facets 7 meet only at short edges 15 or even points, and by selecting the sizes in such a way that the edges 15 are situated adjacent the bottom ends of the edges 14, i.e. just within the outer periphery of the outer parts 1, in the slots there between defined by the longitudinal sides of the outer parts 1 as illustrated diagrammatically in FIG. 6, the nut 5 will be caused to rotate partially as it is drawn towards the head end by the bolt 2.

This rotation is caused partially by the rotational frictional forces exerted on the nut 5 by the bolt 2, but is mainly caused and permitted by the shape of the nut in combination with the thickenings 13, whereby the ramp faces 17 and the edges 14 engage the nut to force the edges 15 thereof into the apieces 11 of the flats 10.

Figure 9:
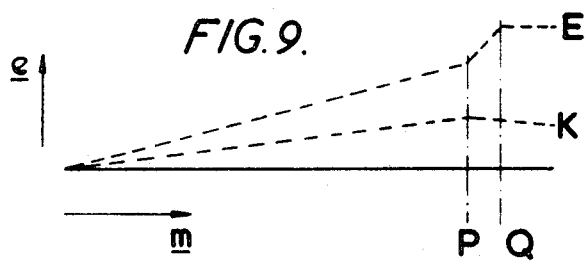
FIG. 9 is a diagram (not to scale) representing the expansion of the wall plug of the invention as compared with a corresponding prior known wall plug.

As shown in the diagram (FIG. 9) movement m of the nut 5 towards the head end plug by the bolt 2, causes the plug to be expanded (indicated by axis e) by divergence of the outer parts 1 by an amount indicated by the line E until a position is reached at P wherein further movement causes the edges 15 to ride up the apices 11 giving a further expansion, as indicated by the increasing slope of the line E from point P to point Q.

Subsequent movement of the nut 5 is along the surfaces 18 and causes little further expansion. It will be appreciated that the initial expansion is due not only to the interaction of the ramp faces 17 with the nut but is compounded and increased by an amount commensurate with the edges 15 being forced into the center lines (apices) of the flats 10.

This cannot occur with the prior known plug of FIG. 10, wherein the nut thereof, when moved, will cause a simple expansion by reaction with the ramp 113. In the limiting position commensurate with line P, movement of the nut can easily cause the outer parts 101 to be bent about the line 111 because line 111 is a weak spot in the outer part, and is much weaker than the outer part of the plug of the invention.

Therefore, for a given expansion the wall plug of the invention may be made smaller, and the bolt shorter, than a corresponding plug of the known type.

The invention is not, however, confined to the precise details of the foregoing example and variations are possible within the scope thereof, as defined by the appended claims.

The flat 10 need not be parallel to the axis, but may slope inwardly from the angle 12 so as to shorten or eliminate the line from the apex 11 to the line 16.

The tapering member may be in the form of the nut 5 described, but, alternatively, the member may be in the form of the head of a bolt, wherein the said head is coned and faceted to function in a manner analogous to the nut 5, the shank of the bolt serving as the previously described bolt 2.

Figure 7:
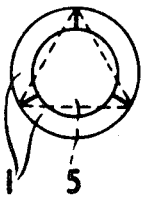
FIG. 7 is a bottom view, similar to FIG. 6, but of a wall plug of the invention having three outer parts.
Figure 8:
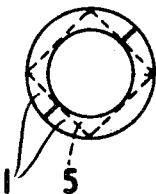
FIG. 8 is a bottom view, similar to FIG. 6, but of a wall plug of the invention having two outer parts.

Also, for example, as shown in FIG. 7 the wall plug may have three outer parts 1, the tapering member, indicated at 5, being substantially triangular; or as shown in FIG. 8, there may be only two outer parts 1, the member 5 having four facets.

Figure 3:
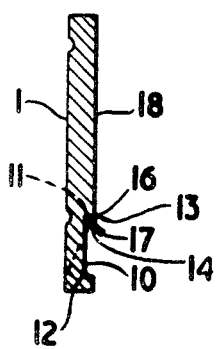
FIG. 3 shows diagrammatically, a section of the outer part corresponding to the line III—III of FIG. 2.

Also, since the flat 10 is triangular and serves to support the flange 9, the ramp faces 17 may have a greater slope (as shown in FIG. 3) and terminate close to the outer circumference of the outer part 1, or may have any suitable lesser slope to the extent where they end at approximately the same level as, but inclined transversely to, the flat 10, thereby to further reinforce the bottom portion of the outer part.

The thickening of the material beginning at the edges 14 may also increase to the desired thickness of material of the outer part, as e.g. in the shape of a ridge.

Having thus described the invention, what is claimed as new and desired to be secured by Letters Patent is:

1. A wall plug or the like comprising:
   a plurality of elongated outer parts arranged about a longitudinal axis of the wall plug and having longitudinal sides extending in substantial parallelism and defining longitudinal slots between adjacent outer parts, each outer part having a head end and a bottom end;
   a rotatable, axially movable member between said outer parts aligned with said axis and having guide parts located at a greater distance from said axis than the remainder of said member;
   guide means on said outer parts adjacent the bottom ends thereof engageable with said guide parts for rotating said member, during axial movement of the latter from the bottom ends of the outer parts toward the head ends of the outer parts, from a position where the guide parts are located in said slots to a position where the guide parts are located between said slots to thereby spread the outer parts; and
   means for limiting rotational movement of the member with respect to the outer parts.

2. The wall plug as claimed in claim 1,
   said member having a leading, frusto-conical portion and a trailing, polygonal portion,
   said trailing portion presenting edges constituting said guide parts.

3. The wall plug as claimed in claim 1,
   each of said outer parts having an inwardly projecting thickening thereon constituting said guide means,
   one side of each thickening substantially coinciding with one of said sides of the respective outer part, and another side of the thickening extending at an acute angle with respect to said one side of the respective outer part and in a direction to provide the thickening with increasing width toward the head end of the outer part.

4. The wall plug as claimed in claim 3,
   there being a pair of said thickenings on each outer part arranged symmetrically with respect to a longitudinal centerline of the outer part,
   the second thickening on each outer part constituting said limiting means.

5. A wall plug or the like comprising:
   a plurality of elongated outer parts arranged about a lngitudinal axis of the wall plug and having longitudinal sides extending in substantial parallelism, each outer part having a head end an a bottom end;
   a rotatable, axially movable member between said outer parts aligned with said axis and having guide parts located at a greater distance from said axis than the remainder of said member;
   guide means on said outer parts adjacent the bottom ends thereof, including an inwardly projecting thickening each outer part engageable with said guide parts for rotating said member during axial movement of the latter from the bottom ends of the outer parts toward the head ends thereof to spread the outer parts,
   one side of each thickening substantially coinciding with one of said sides of the respective outer part, and another side of the thickening extending at an arcuate angle with respect to said one side of the respective outer part and in a direction to provide the thickening with increasing width toward the head end of the outer part; and
   means for limiting rotational movement of the member with respect to the outer parts.

6. The wall plug as claimed in claim 5,
   said member having a leading, frusto-conical portin, and a trailing portion provided with said guide parts.

7. The wall plug as claimed in claim 6,
   said trailing portion of the member being of polygonal configuration and presenting a number of spaced edges corresponding to the number of outer parts,
   said edges constituting said guide parts.

8. The wall plug as claimed in claim 5,
   there being a pair of said thickenings on each outer part arranged symmetrically with respect to a longitudinal centerline of the outer part, the second thickening on each outer part constituting said limiting means.

9. The wall plug as claimed in claim 5, said bottom ends of the outer parts being provided with flanges for retaining said member.

References Cited

UNITED STATES PATENTS

| | | | |
|---|---|---|---|
| 1,407,782 | 2/1922 | Church et al. | 85—75 |
| 2,373,585 | 4/1945 | Mancini | 85—75 |
| 2,748,594 | 6/1956 | Edwards | 85—79 |

FOREIGN PATENTS

| | | |
|---|---|---|
| 444,623 | 3/1936 | Great Britain. |
| 505,145 | 4/1920 | France. |
| 80,883 | 5/1963 | France. |
| 300,177 | 9/1965 | Netherlands. |

MARION PARSONS, Jr., Primary Examiner

U.S. Cl. X.R.

85—87